United States Patent [19]
Cook

[11] 3,799,309
[45] Mar. 26, 1974

[54] CLUTCH DRIVEN MEMBER ASSEMBLY WITH VIBRATION DAMPER

[75] Inventor: Leo W. Cook, Chicago, Ill.

[73] Assignee: Borg-Warner Corporation, Chicago, Ill.

[22] Filed: July 10, 1972

[21] Appl. No.: 270,423

[52] U.S. Cl. ............................. 192/106.2
[51] Int. Cl. ............................. F16d 3/14
[58] Field of Search ............... 192/106.2, 106.1

[56] References Cited
UNITED STATES PATENTS

| | | | |
|---|---|---|---|
| 2,294,638 | 9/1942 | Tower | 192/106.2 |
| 2,613,785 | 10/1952 | Mohns | 192/106.2 X |
| 2,687,627 | 8/1954 | Binder | 192/106.2 X |
| 2,745,268 | 5/1956 | Reed | 192/106.2 X |
| 3,362,194 | 1/1968 | Berlelson et al. | 192/106.2 X |
| 2,284,278 | 5/1942 | Goodwin | 192/106.2 |
| 2,291,405 | 7/1942 | Nutt | 192/106.2 |

*Primary Examiner*—Benjamin W. Wyche
*Attorney, Agent, or Firm*—Donald W. Banner

[57] ABSTRACT

A clutch driven member assembly of the damper type including a hub, a single formed drive plate, a plurality of damper springs, and a friction surface supporting means, the hub including radially directed lugs which frictionally engage the supporting means. The drive plate is secured to the supporting means and frictionally engages the hub. The springs are disposed in notches formed in the hub and pockets formed in the drive plate, and serve to resiliently transmit torque between the hub and the drive plate and supporting means.

7 Claims, 15 Drawing Figures

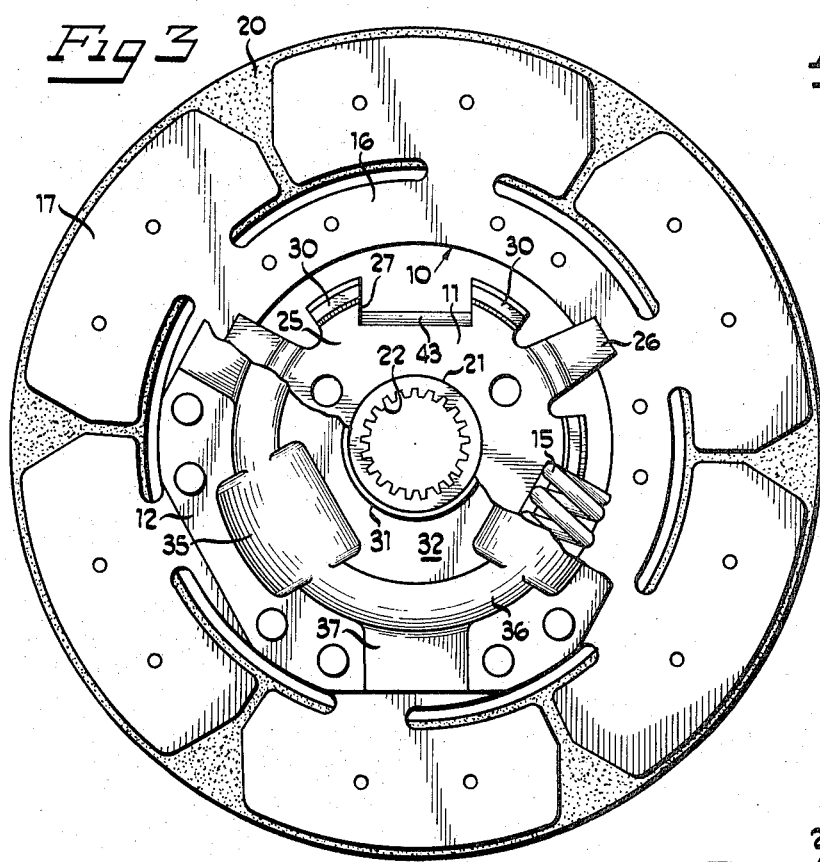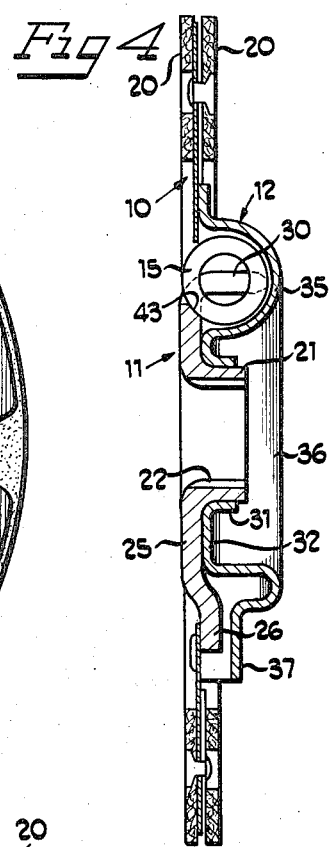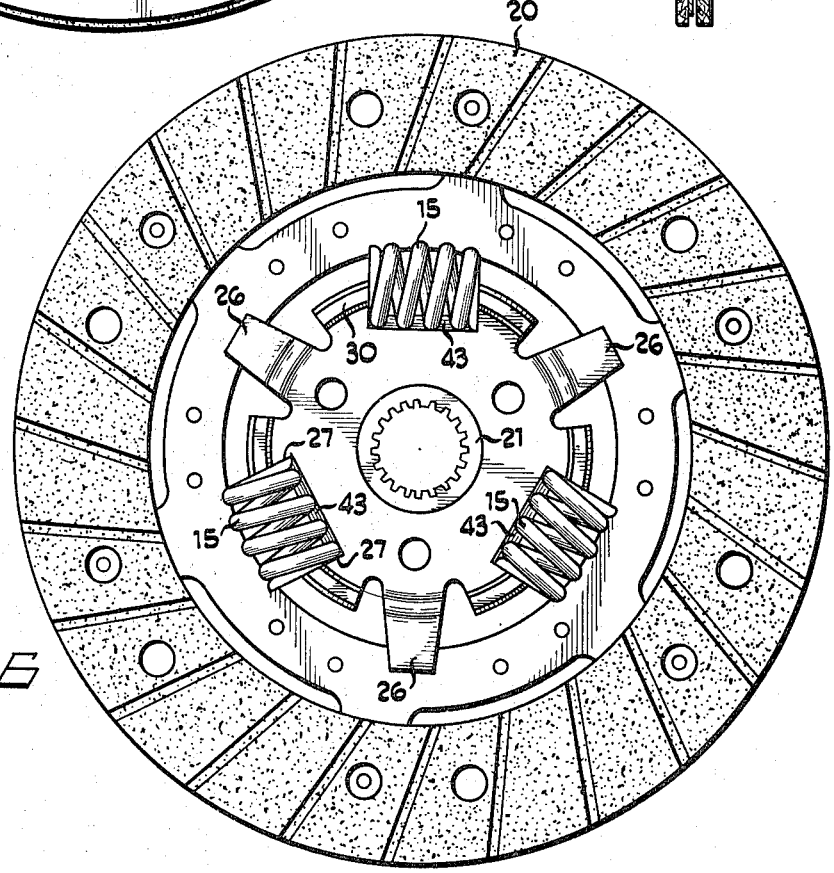

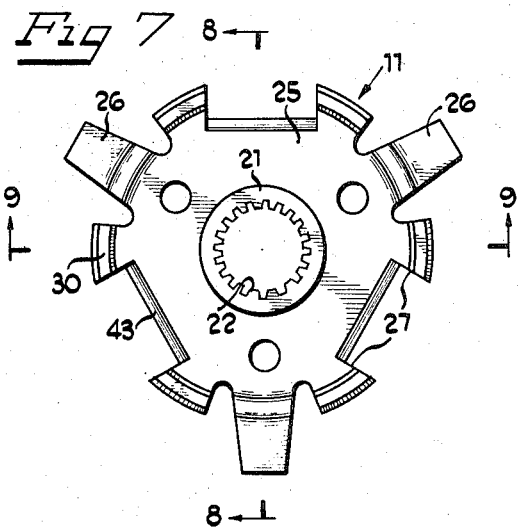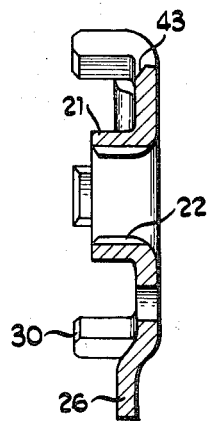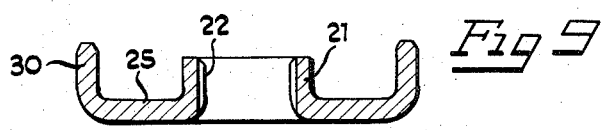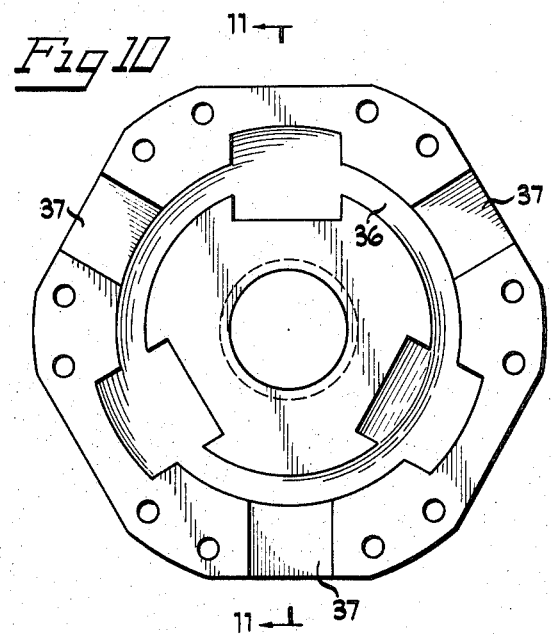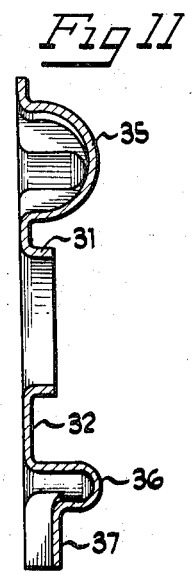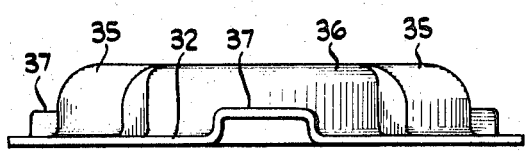

CLUTCH DRIVEN MEMBER ASSEMBLY WITH VIBRATION DAMPER

SUMMARY OF THE INVENTION

This invention relates to clutch driven member assemblies of the type normally used in vehicle applications and, more particularly, it relates to driven member assemblies of the damper type incorporating means for reducing drive line vibration.

Vibration damper constructions for vehicle friction clutches are well known in the art as typified by U. S. Pat. No. 1,830,746. Dampeners of this type are generally embodied in a clutch driven member assembly which is interposed between a driving member and a driven member such as between a vehicle engine flywheel and the transmission. In vibration dampeners of this type, damper springs are usually interposed between the driven friction plate and a hub member, which is connected to the vehicle transmission, in order to provide a torsional vibration cushion or dampener sufficiently yieldable to absorb torque pulsation originating from the engine.

Generally, prior art devices of this type include a hub member having a flange, a plurality of damper springs and a pair of drive plates each overlapping the hub flange on one side thereof.

The present invention provides a damped driven plate assembly of economical construction wherein a single, formed drive plate replaces the usual two drive plates. Part of the friction damping is taken on a large radius by virtue of radially extending lugs from the hub contacting the friction surface supporting means radially outward of the damper springs. The particular construction of the hub lends itself to stamping for economy of manufacture. The resultant driven member assembly has fewer parts than prior art devices resulting in a lower cost device.

BRIEF DESCRIPTION OF THE DRAWINGS

FIG. 3 is a top view of the driven member assembly partially broken away.

FIG. 4 is a side view in section taken along the lines 4—4 of FIG. 1.

FIG. 6 is a top view of the driven member assembly with the drive plate removed.

FIG. 7 is a top view of the hub member.

FIG. 8 is a sectional view taken along the lines 8—8 of FIG. 7.

FIG. 9 is a sectional view taken along the lines 9—9 of FIG. 7.

FIG. 10 is a bottom view of the drive plate.

FIG. 11 is a side view in section taken along the lines 11—11 of FIG. 10.

FIG. 12 is a peripheral view of the drive plate.

DESCRIPTION OF THE PREFERRED EMBODIMENTS

Figure 1:
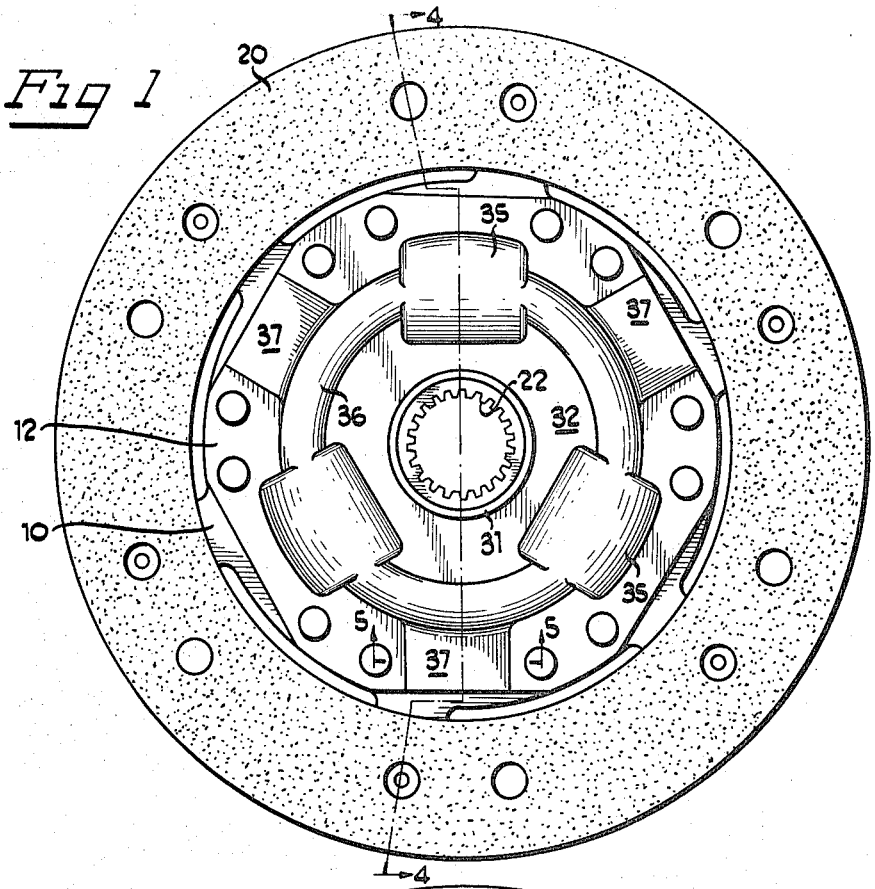
FIG. 1 is a top view of the driven member assembly of the present invention.
Figure 2:
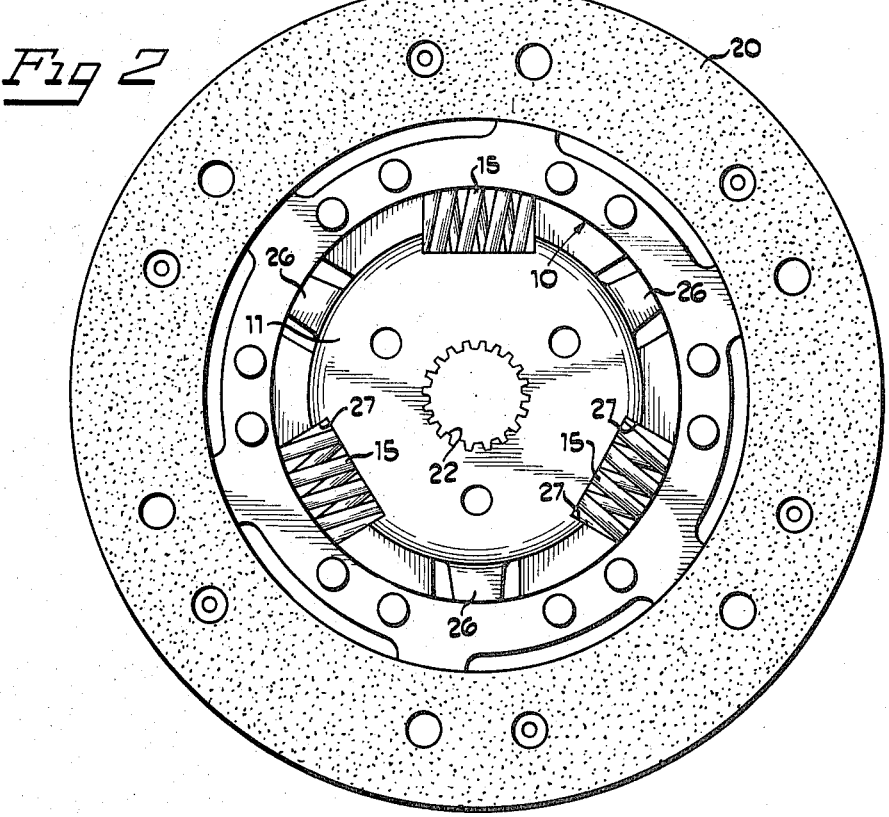
FIG. 2 is a bottom view of the driven member assembly.

There is shown, in FIGS. 1 and 2, one embodiment of a driven member assembly incorporating vibration damping means, which assembly includes four major components; a friction surface supporting means 10, a hub member 11, a drive plate 12, and a plurality of damper springs 15. The supporting means 10, as best seen in FIG. 3, is formed of sheet metal and includes an annular integral ring section 16 carrying a plurality of circumferentially spaced and radially, outwardly extending spring cushions 17. The spring cushions 17, in turn, carry friction facings 20 on opposite sides thereof which are adapted to be disposed between driving members in a conventional clutching manner.

The hub 11, as best seen in FIGS. 7, 8 and 9, defines a centrally located, annular, flanged portion 21 which includes an internal spline 22 for connecting the hub 11 to an input member of a transmission. The hub 11 includes a web portion 25 extending from the flange portion 21. A plurality of lugs 26 (here illustrated as three) are shown extending radially outwardly from the web portion 25. A plurality of notches 27 are shown defined by the hub 11. A plurality of upturned fingers 30 annularly formed are shown extending substantially perpendicular to the plane of the web portion 25.

As best seen in FIGS. 10, 11 and 12, the formed drive plate 12 includes a centrally located flange portion 31 adapted to overlie the flange portion 21 of the hub 11. A web portion 32 extends from the flange portion 31. A plurality of spring pockets 35 are shown formed in the drive plate 12. A raised annular rib 36 interconnects the spring pockets 35. A plurality of raised radially extending channel sections 37 are shown formed at the outer periphery of the drive plate.

The elements comprising the driven member assembly are assembled together as follows. The springs 15 are inserted in the pockets 35 of the drive plate 12. The hub 11 is centered with respect to the drive plate 12 by inserting or piloting the flanged portion 21 of the hub 11 within the flanged portion 31 of the drive plate 12, such that the springs 15 fit within the notches 27 formed in the hub 11 and between the pairs of upturned fingers 30. The friction surface supporting means 10 is then fastened to the drive plate 12 by any of a number of conventional methods, such as rivets which are illustrated. The upturned fingers 30 are disposed within and have clearance with the rib 36. The damper assembly is thus held together as a unit and attachment of the friction facings by riveting completes the driven member assembly. The pockets 35 in the drive plate 12 restrain the damper springs 15 against axial movement in one direction. A chamfer 43 is provided in the web portion 25 of the hub which, in cooperation with the inner diameter of the friction surface supporting means, acts to restrain the springs 15 against movement in the other axial direction.

The drive plate 12 and supporting means 10 are connected together such that pretension is established between the web portions 32 and 25 of the drive plate and hub respectively, and between the lugs 26 and the ring section 16. Such pretensioning results in a friction damping force existing between lugs 26 and ring section 16 and between the web portions 32 and 25 during relative rotation between the hub and either the supporting means 10 and drive plate 12.

Figure 5A:
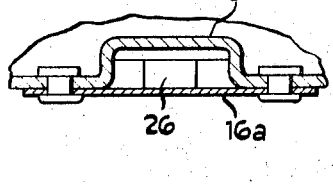
FIG. 5A is a partial view in section taken along the lines 5—5 of FIG. 1.
Figure 5B:
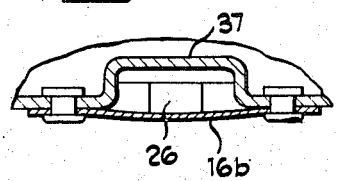
FIG. 5B shows an alternative embodiment of the structure shown in 5A.
Figure 5C:
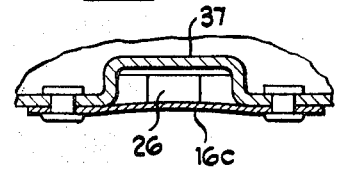
FIG. 5C shows another alternate embodiment of the structure shown in 5A.

The engagement between the lugs 26 and the ring section 16 is best illustrated in FIGS. 5A, 5B and 5C. The degree of friction damping force can be varied to suit different vehicle requirements. FIG. 5A discloses a substantially flat ring portion 16A providing a substantially constant friction damping force with the lugs 26. FIG. 5B shows an alternate arrangement whereby the ring portion 16B is bowed slightly downwardly to provide a variable friction damping force which increases with relative rotation between hub and friction supporting member. FIG. 5C shows ring portion 16C arched in the opposite direction to provide high initial friction damping decreasing with relative movement between hub and supporting member. Another method of varying the friction damping force is by applying a coating of either low friction or high friction material, such as for example, teflon or asbestos, to the surface of the ring section 16 that engages the lugs 26. The particular coating material can be varied over a wide range of coefficients of friction to tailor the friction damping characteristics of any driven member assembly to any particular vehicle requirement.

The operation of the driven member assembly shown and described herein is as follows. The friction facings 20, in the clutch engaged condition, are clamped between a driving member, such as a flywheel, and a pressure plate assembly. Torque is transmitted through the annular friction facings 20 to the supporting means 10. The drive plate 12, through its connection to the supporting means 10, transmits this torque through the damper spring 15 to the hub 11 and thence, through its splined connection 22, to a transmission input shaft. This torque transmittal results in an angular relative rotation between the hub 11 and the connected unit consisting of the supporting means 10 and drive plate 12. The angular travel is limited by the radially extending lugs 26 striking the inner side of the raised channels 37. The friction damping force previously described, exerted between the hub and the drive plate and supporting means aids in damping torsional vibration.

Figure 13:
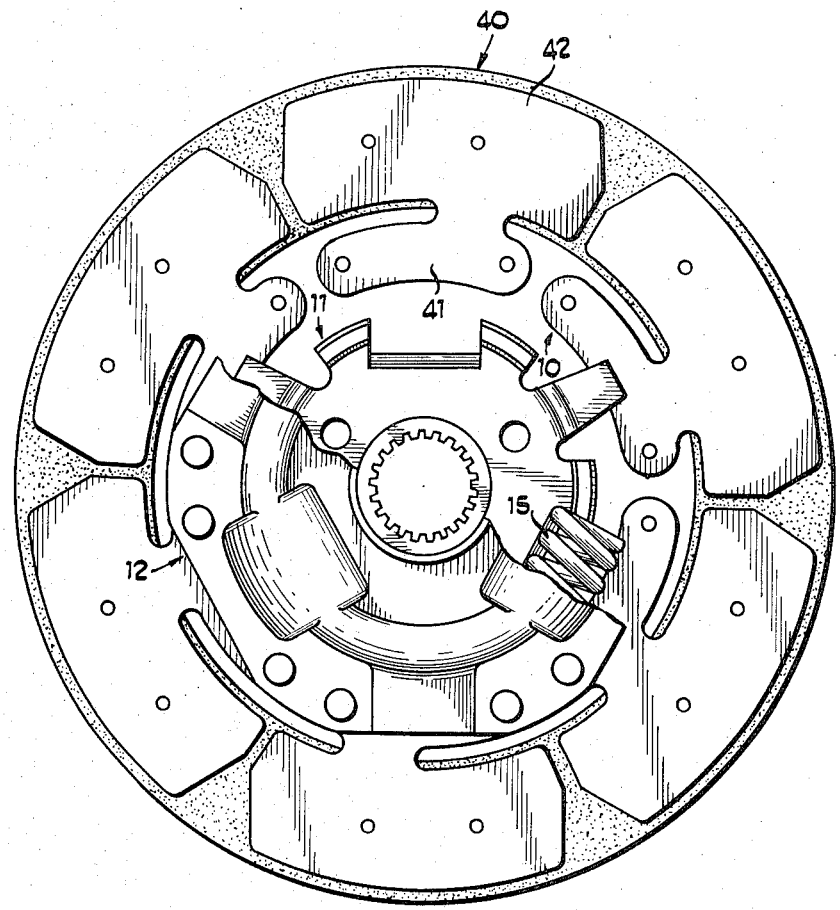
FIG. 13 is a top view partially broken away of an alternative embodiment of the driven member assembly.

An alternative embodiment of a driven member assembly is shown in FIG. 13 in which the friction surface supporting means 10 consists of a plurality of individual discrete cushion segments 40, each fastened to the drive plate 12. The cushion segments 40 include a radially inner foot section 41 adapted for attachment to the drive plate 12 and a radially outer flag section 42 adapted to be attached on either side to an annular friction facing 20. The foot sections 41 are attached to the drive plate 12 such that at least a portion of each one is in contact with the radial lugs 26 in a pretensioned condition.

The operation of the embodiment shown in FIG. 13 is, in all essential respects, the same as the operation of the driven plate assembly shown in FIG. 1 and previously described.

While this invention has been described in connection with certain specific embodiments thereof, it is to be understood that this is by way of illustration and not by way of limitation and the scope of this invention is defined solely by the appended claims which should be construed as broadly as the prior art will permit.

What is claimed is:

1. A clutch driven member assembly comprising in combination a hub member including connecting means defined by said hub member adapted to connect said hub member to an output, an integral web portion extending from said connecting means, a plurality of lugs extending radially outwardly from said web portion, a plurality of notches defined in said hub member; friction surface supporting means adapted to be attached to friction material on each side thereof; a formed drive plate attached to said supporting means and overlying said hub member such that said lugs of said hub member are pressed against said supporting means in frictional engagement therewith to provide a friction damping force between said hub and said supporting means, a plurality of spring pockets formed in said drive plate and adapted to be aligned with the notches in said hub member, a plurality of damper springs disposed in said notches and in said spring pockets and adapted to transmit torque between said hub member and said drive plate, and a plurality of upturned fingers integral with and substantially perpendicular to the plane of said hub member, said fingers being located at the opposite ends of each notch to contact the ends of said springs, said drive plate frictionally engaging said hub member to provide a friction damping force between said hub member and said drive plate.

2. A clutch driven member assembly as in claim 1 in which said drive plate includes an annular rib forming a channel therein connecting said spring pockets and receiving said upturned fingers and a plurality of raised channel sections adapted to overlie said lugs, the sides of said channel sections defining stops to limit the rotation of said hub member with respect to said drive plate.

3. A clutch driven member assembly as in claim 2 in which said friction surface supporting means includes an annular integral ring and a plurality of circumferentially spaced radially extending spring cushions, and means defined between said hub member and said friction surface supporting means to vary the friction damping force between said hub member and said friction surface supporting means with relative rotation therebetween.

4. A clutch driven member assembly as in claim 3 in which said ring adjacent each lug is bowed outwardly away from the lug so that the friction damping force increases as the relative rotation between said hub member and said friction surface supporting means increases.

5. A clutch driven member assembly as in claim 3 in which said ring adjacent each lug is bowed inwardly towards the lug so that the friction damping force decreases as the relative rotation between said hub member and said friction surface supporting means increases.

6. A clutch driven member assembly as in claim 3 in which said frictional engagement between said lugs and said friction surface supporting means takes place radially outwardly of said damper springs.

7. A clutch driven member assembly as in claim 2 in which said friction surface supporting means includes a plurality of discrete cushion segments each of which are attached to said drive plate.

* * * * *